United States Patent [19]
Chubb

[11] Patent Number: 5,080,724
[45] Date of Patent: Jan. 14, 1992

[54] SELECTIVE EMITTERS

[75] Inventor: Donald L. Chubb, Olmsted Falls, Ohio

[73] Assignee: The United States of America as represented by the Administrator of the National Aeronautics and Space Administration, Washington, D.C.

[21] Appl. No.: 503,486

[22] Filed: Mar. 30, 1990

[51] Int. Cl.⁵ .......................................... H01C 31/058
[52] U.S. Cl. .................................................... 136/253
[58] Field of Search ......................................... 136/253

[56] References Cited

U.S. PATENT DOCUMENTS

| | | | |
|---|---|---|---|
| 3,751,303 | 8/1973 | Kittl | 136/253 |
| 3,929,510 | 12/1975 | Kittl | 136/247 |
| 4,584,426 | 4/1986 | Nelson | 136/253 |
| 4,707,560 | 11/1987 | Hottel et al. | 136/253 |
| 4,746,370 | 5/1988 | Woolf | 136/246 |
| 4,750,943 | 6/1988 | Nelson | 136/253 |
| 4,776,895 | 10/1988 | Goldstein | 136/253 |
| 4,836,862 | 6/1989 | Pelka et al. | 136/253 |

*Primary Examiner*—Aaron Weisstuch
*Attorney, Agent, or Firm*—Gene E. Shook; John R. Manning; James A. Mackin

[57] ABSTRACT

This invention relates to a small particle selective emitter for converting thermal energy into narrow band radiation with high efficiency. The small particle selective emitter is used in combination with a photovoltaic array to provide a thermal to electrical energy conversion device. An energy conversion apparatus of this type is called a thermo-photovoltaic device.

In the first embodiment, small diameter particles of a rare earth oxide are suspended in an inert gas enclosed between concentric cylinders as shown in FIG. 1. The rare earth oxides are used because they have the desired property of large emittance in a narrow wavelength band and small emittance outside the band. However, it should be emphasized that it is the smallness of the particles that enhances the radiation property. As shown in FIG. 1, the small particle selective emitter is surrounded by a photovoltaic array.

In an alternate embodiment, the small particle gas mixture is circulated through a thermal energy source as shown in FIG. 2. This thermal energy source can be a nuclear reactor, solar receiver, or combustor of a fossil fuel.

10 Claims, 4 Drawing Sheets

2

SELECTIVE EMITTERS

ORIGIN OF THE INVENTION

The invention described herein was made by an employee of the United States Government and may be manufactured and used by or for the Government for governmental purposes without the payment of any royalties thereon or therefor.

TECHNICAL FIELD

Selective emitters are devices for converting thermal energy into narrow band radiation. Such devices are of both the thin film and the small particle types. If the narrow band output of the selective emitter is in the visible region of the spectrum, then the device can be used as an efficient light source. If the output is in the infrared region of the spectrum, it can be efficiently converted into electrical energy by a photovoltaic array. The combination of the selective emitter and a photovoltaic array is a thermal to electric energy conversion device. Such energy conversion devices are called thermophotovoltaic devices.

Solid selective emitters of the prior art have not been efficient. However, a solid selective emitter which utilizes small diameter filaments of rare earth oxides has improved efficiency. Such an emitter is described in U.S. Pat. No. 4,584,426 to Nelson. It is the small diameter filaments that produce the improved efficiency in this emitter.

It is, therefor, an object of the present invention to produce a selective emitter which achieves even higher efficiency than the prior art devices by utilizing either particles of very small diameters or thin films.

An additional object of the invention is to provide a selective emitter having a simple design.

A further object of the invention is to provide a selective emitter which can be directly coupled to various thermal sources.

A still further object of the invention is to provide a selective emitter which can operate at vacuum conditions.

Still another object of the invention is to provide a selective emitter which will eliminate the evaporative losses.

BACKGROUND ART

U.S. Pat. No. 3,751,303 to Kittl discloses an energy conversion system which includes a rare earth oxide selective emitter and a photovoltaic cell to provide thermal-to-photo-to electrical energy conversion. Likewise, U.S. Pat. No. 3,929,510 to Kittl discloses a solar radiation conversion system which includes a solar radiation-to-silicon cell spectral matching means having ytterbium oxide applied as a layer or coating.

U.S. Pat. No. 4,776,895 to Goldstein discloses a thermophotoceramic doped with a rare earth metal oxide. The photovoltaic selector is matched to the emitter so as to absorb radiation in the same bands as the emitter.

U.S. Pat. No. 4,707,560 to Hottel et al is directed to a thermophotovoltaic system including a rare earth emitter disposed concentrically within a photocell array matched to the frequency of the emitter.

U.S. Pat. No. 4,750,943 to Nelson describes a thermophotovoltaic system including a narrow band emitter spaced and optically isolated from the thermal energy source of the system. A photocell array is optically coupled to the emitter.

U.S. Pat. No. 4,746,370 to Woolf is concerned with a photothermophotovoltaic converter which is used to convert solar radiation to heat. The heat is used to excite an emitter which radiates onto a photovoltaic panel.

DISCLOSURE OF THE INVENTION

The problems of the prior art may be solved and the objects achieved by the present invention in which a selective emitter is used to convert thermal energy into narrow band radiation with high efficiency. The characteristic dimension of the selective emitter must be small in order to obtain high efficiency. Both of the selective emitters in this disclosure have small characteristic dimensions. A selective emitter is used in combination with a photovoltaic array to provide a thermal to electrical energy conversion device.

One such device uses a thin film selective emitter for converting thermal energy to energy in a narrow light bandwidth. This light is coupled into a photocell which then converts the light into electrical energy. The selective emitter is made by applying a thin film of a rare earth oxide, such as neodymia, erbia, and the like, onto a low emittance substrate such as sapphire. This type of selective emitter is more durable against vibration and impacts than the more conventional fibrous selective emitter.

In another selective emitter small diameter particles of a rare earth oxide are suspended in an inert gas enclosed between concentric cylinders. The rare earth oxides are used because they have the desired properties of large emittance in a narrow wavelength band and small emittance outside the band. In an alternate embodiment, the small particle gas mixture is circulated through a thermal energy source which can be nuclear reactor, solar receiver, or combustor of a fossil fuel.

BRIEF DESCRIPTION OF THE DRAWINGS

The objects, advantages and novel features of the invention will be more fully apparent from the following detailed description when read in connection with the accompanying drawings in which.

BEST MODE FOR CARRYING OUT THE INVENTION

Figure 1:
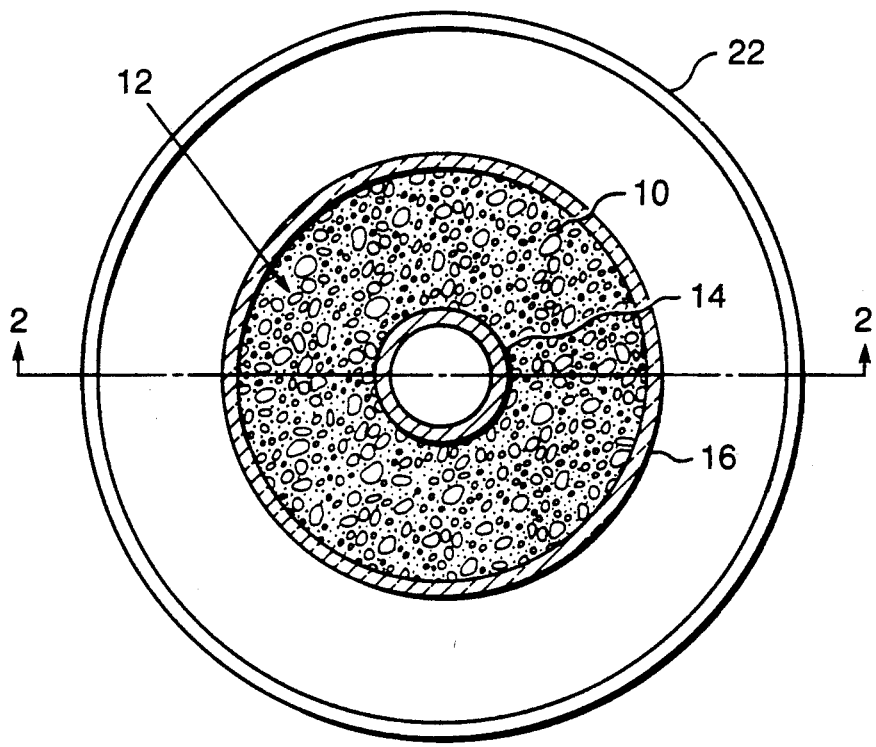
FIG. 1 is a horizontal sectional view of a small particle selective emitter constructed in accordance with the present invention.
Figure 2:
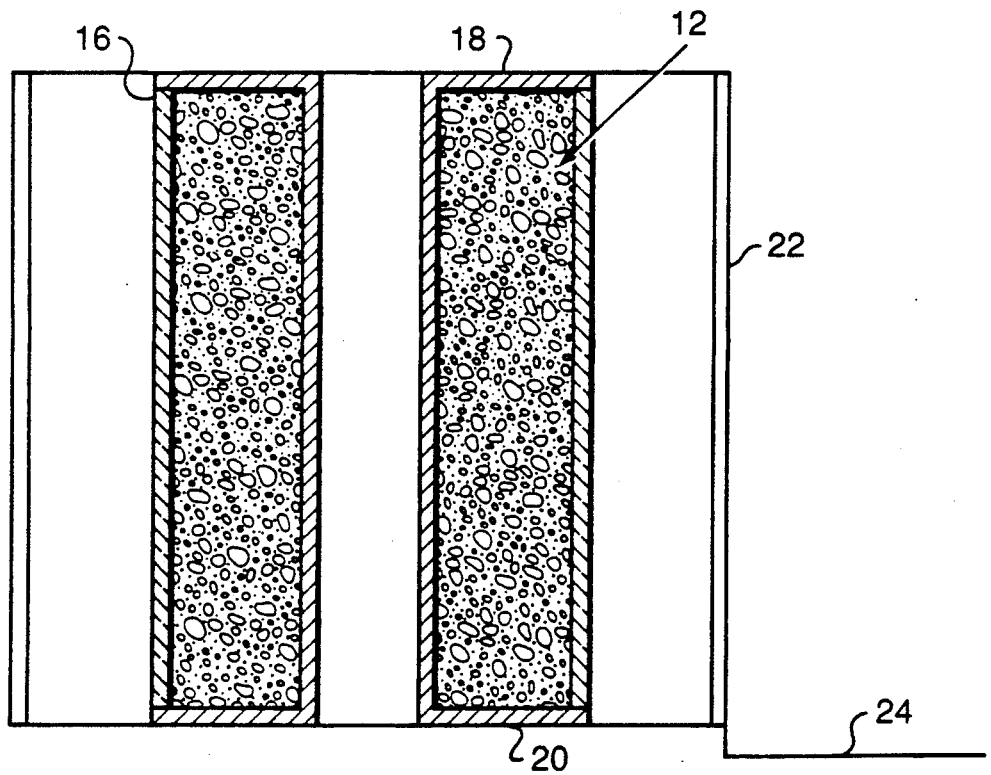
FIG. 2 is a vertical sectional view taken along the line 2—2 in FIG. 1.

Referring now to the drawings, there is shown a selective emitter of the small particle type (SPSE) in FIGS. 1 and 2. Small particles 10 of a rare earth oxide are suspended in an inert gas contained in a chamber 12 formed by the space between an inner cylindrical wall 14 and an outer cylindrical window 16. The volume of the chamber 12 is sealed by end walls 18 and 20.

This chamber 12 holds the small particles of a rare earth oxide, such as neodymia ($Nd_2O_3$), erbia ($Eb_2O_3$), holmia ($Ho_2O_3$), or ytterbia ($Yb_2O_3$) suspended in an inert gas such as helium. Rare earths are used because they have the desired property of large emittance in a narrow wavelength band and small emittance outside that band. However, it is emphasized that it is the smallness of the particles that enhances this radiation property. Therefore, materials other than the rare earths may exhibit the same radiation property when used in very small diameters between 0.01 $\mu$m and 0.1 $\mu$m.

In the embodiment shown in FIGS. 1 and 2, the small particle gas mixture that is enclosed between the concentric cylinders made of an inner low emittance material and an outer window material is heated by a flame or hot gas flow from a thermal energy source through the inner cylinder 14. The operating temperature for the SPSE will be in the range of 1000-2000 K. to obtain high efficiency. At a temperature of 1000 K. using small neodymia particles having diameters in the 0.01 $\mu$m-0.1 $\mu$m range in helium, an efficiency of greater than 70% has been calculated. This efficiency is defined as:

$$\eta_E = \frac{\text{Emitted Power in Emission Band Centered at } \lambda = 2.4 \ \mu m}{\text{Total Emitted Power}}$$

For the lower temperatures of 1000 K. to 1500 K., a high temperature glass or fused silica can be used for both the inner cylinder 14 and the outer window cylinder 16. At higher temperatures sapphire ($Al_2O_3$) can form the inner cylinder 14 and the outer window 16.

The SPSE configuration shown in FIG. 1 has the small particle gas mixture in a sealed, separate compartment 12 from the thermal energy source, such as a flame or hot gas flow, passing through the cylinder 14. If the system operates in the Earth's gravity field in a vertical direction, then a free convection flow field will exist. The resulting flow velocities on the order 1 cm/sec. will produce a drag force on the small particles large enough to overcome the gravity force. Therefore, the small particles will be distributed throughout their confining compartment. If there is no gravity field, the small particles 10 will remain distributed throughout the gas.

As shown in FIGS. 1 and 2, the SPSE is shown surrounded by a photovoltaic array 22 which supplies power to an electrical power outlet 24. As a result, the combination of the SPSE and the photovoltaic array 22 is a thermophotovoltaic energy converter for supplying electrical energy to the power outlet 24.

The output photon energy, hv, of the SPSE is at an energy equal to or slightly greater than the energy, $E_g$, of the photovoltaic material. As a result the photovoltaic efficiency will be high. This efficiency is the output electrical power/narrow band input radiation power.

Description of Alternate Embodiments

Figure 3:
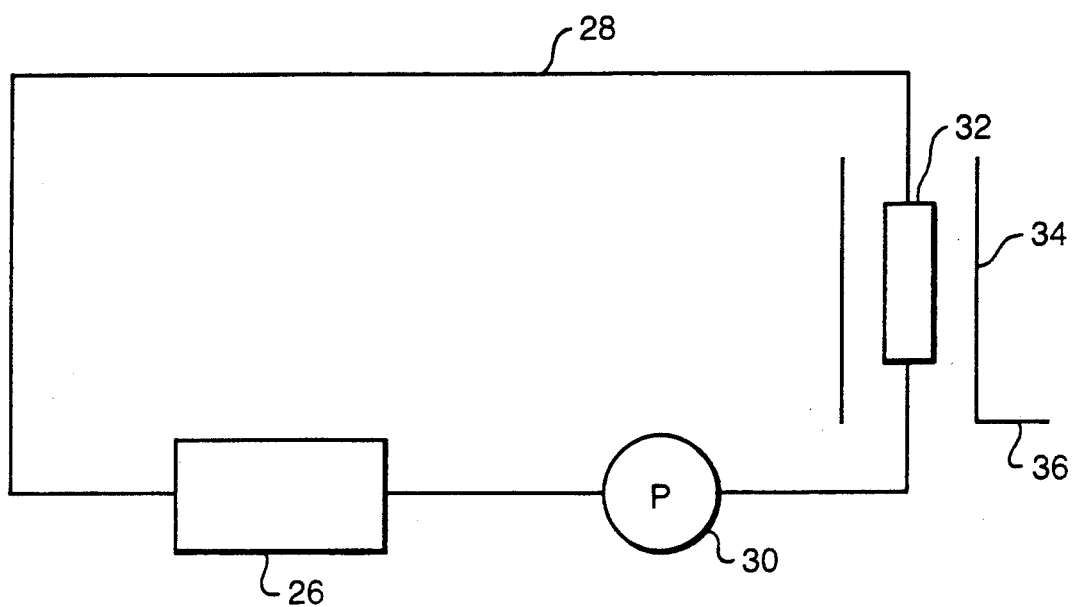
FIG. 3 is a schematic view showing a small particle selective emitter directly connected to a thermal energy source.

Another configuration for the SPSE is shown in FIG. 3. In this embodiment, a small particle gas mixture of the type contained in the chamber 12 shown in FIGS. 1 and 2 is circulated through a thermal energy source 26 rather than being separated from the thermal energy source as in the embodiment shown in FIGS. 1 and 2. The thermal energy source can be a nuclear reactor, solar receiver or combustor of a fossil fuel.

In the embodiment shown in FIG. 3, the small particle gas mixture is forced through metal pipes 28 with a pump 30. This forced flow will distribute the small particles throughout the gas. The small particle gas mixture passes through a cylindrical chamber 32 which is similar to the chamber 12 of FIGS. 1 and 2 in that it is surrounded by a photovoltaic array 34. The wall of the chamber 32 is made of a window material similar to that used for the cylindrical window 16 in FIGS. 1 and 2. Also, the photovoltaic array 34 provides electrical power to an electrical power outlet 36. Thus, the embodiment shown in FIG. 3 is a thermophotovoltaic energy converter similar to the one shown in FIGS. 1 and 2.

The small particle selective emitter should have higher efficiency than the solid selective emitters of the prior art because of the small diameter (0.01-0.1 micrometers) of the particles. In addition to the improved efficiency, the small particle selective emitter can be directly coupled to various thermal sources such as a nuclear reactor, solar receiver or a combustor of fossil fuels.

Another advantage of the small particle selective emitter is that for space power applications, a solid selective emitter will have to operate in vacuum conditions. Thus, the hot solid emitter mass will diminish by evaporation. No evaporative losses will occur with a small particle selective emitter because the particles are suspended in an inert gas, such as helium, at near atmospheric pressure.

Figure 4:
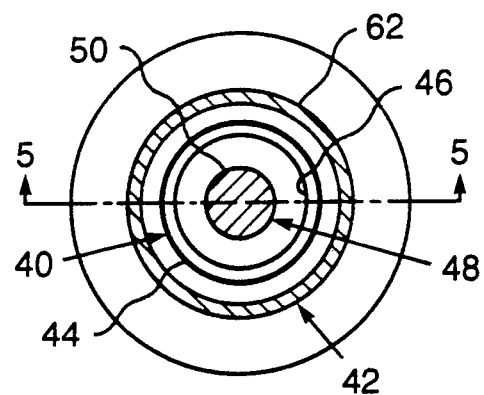
FIG. 4 is a horizontal sectional view of a thin film selective emitter constructed in accordance with the present invention.
Figure 5:
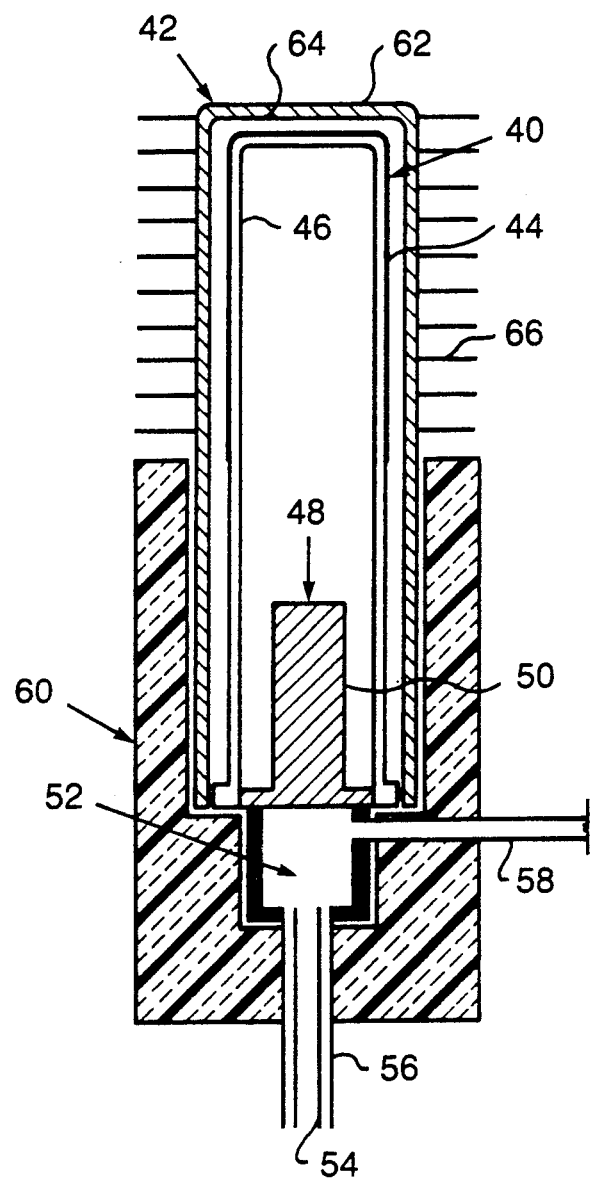
FIG. 5 is a vertical sectional view taken along the line 5—5 in FIG. 4.

A selective emitter of the thin film type for converting thermal energy into narrow band radiation is shown in FIGS. 4 and 5. This thin film selective emitter (TFSE) has a simplified and durable design.

FIGS. 4 and 5 show a TFSE with the emitted radiation being converted to electrical energy by photovoltaic array. As a result, the combination of the TFSE and the photovoltaic array is a thermophotovoltaic energy converter.

This TFSE utilizes an emitter 40 surrounded by a photovoltaic array 42. The emitter 40 comprises a thin film 44 of a rare earth oxide, such as neodymia ($Nb_2O_3$), erbia ($Eb_2O_3$), holmia ($Ho_2O_3$), or ytterbia ($Yb_2O_3$), that is deposited on a low emittance substrate 46, such as sapphire ($Al_2O_3$).

The sapphire tube 46 is filled with a non-emitting inert gas such as helium. The gas serves as a heat transfer medium between the input thermal energy from a heat source 48 and the sapphire.

The heat source 48 comprises a block 50 of a good heat conducting metal, such as copper, which is used to transfer heat from combustion gases in a combustion chamber 52 to the fill gas (He) in the sapphire tube 46.

A fuel is supplied to the combustion chamber 52 through an inner pipe 54 that is surrounded by an outer pipe 56. An oxidizer is supplied to the combustion chamber 52 through this outer pipe 56.

Combustion products from the fuel and oxidizer in the combustion chamber 52 are removed by an exhaust line 58. Suitable thermal insulation 60 encloses the heat source 48.

The photovoltaic array 42 is made of a plurality of photovoltaic cells 62 on a substrate 64 of silica glass. The substrate 64 also provides a vacuum layer around the emitter 40. The photovoltaic array cells 62 are cooled by fins 66.

Rare earths are used for the film 44 because they have the desired property of large emittance in a narrow band and small emittance outside the band. The film is quite thin, having a thickness of between about 1 nanometer and about 10 nanometers.

The output photon energy, hv, of the TFSE is at an energy equal to or slightly greater than the bandgap energy, $E_g$, of the photovoltaic material. As a result, the photovoltaic efficiency will be high. The photovoltaic efficiency is the output electrical power/narrow band input radiation power.

To obtain high emitter efficiency the material of the substrate 46 must have low emittance. Sapphire is the optimum substrate material because it is capable of operating in the temperature range of 1000 K. to 2000 K., where the emitter 40 is the most efficient. For emitter temperatures in the 1000 K. to 2000 K., calculations yield an emitter efficiency, $N_E$, for neodymia greater than 40% if sapphire emittance is low, i.e., less than 0.1. Emitter efficiency is defined as the power emitted in the emission band divided by the total radiated power.

Rare earth oxide films 44 can be deposited on the sapphire substrate 46 by ion beam sputtering. This is a simpler process than the chemical process used for making solid state emitters of the prior art.

The thin film selective emitter can easily operate in a gravity field, whereas small particle selective emitters require convection currents to maintain the suspension of small particles. The thin film selective emitter also is more durable against vibrations and impacts than the solid emitters which utilize small fibers.

The embodiment shown in FIGS. 4 and 5 is preferable for a low power application using combustion as the thermal energy input. The central metal block or slug 50 is used to aid in heat transfer between the flame and the gas. To reduce radiation from this slug 50 to the outside, which is a system loss, the slug is hidden from the outside by the insulation 60. Also, to eliminate convective heat transfer losses the emitter 40 is surrounded by a vacuum layer between the sapphire substrate 46 and the silica glass substrate 64.

Figure 6:
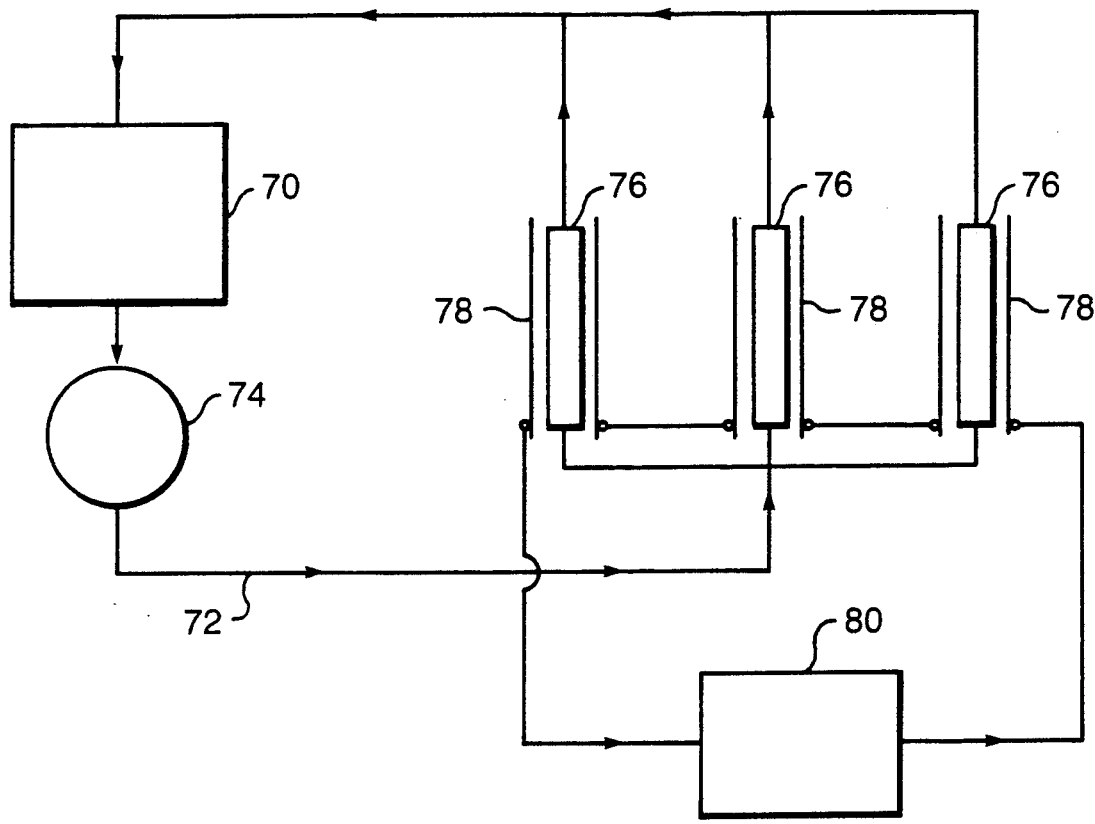
FIG. 6 is a schematic view showing thin film selective emitters used in a high power thermophotovoltaic energy converter.

For high power applications where a large thermal energy source such as a nuclear reactor or solar receiver is used, the embodiment shown in FIG. 6 is used. A hot inert gas, such as helium, is circulated through a thermal source 70 and insulated pipes 72 by a pump 74. This hot inert gas is carried to one or more thin film emitters 76 that are surrounded by photovoltaic arrays 78. The output of the emitter 76 then supplies narrow band radiation to the photovoltaic arrays 78 which are cooled by a radiator 80.

While several embodiments of the invention have been disclosed and described, it will be apparent that various structural modifications may be made without departing the spirit of the invention and the scope of the subjoined claims.

I claim:

1. Apparatus for converting thermal energy to electrical energy comprising
    a sapphire tube forming a low emittance substrate,
    a heat source in said tube,
    a non-emitting inert gas in said tube for transferring thermal energy from said heat source to said tube,
    a selective emitter comprising a rare earth oxide thin film having large emittance in a narrow band and small emittance outside said band with a thickness between about one nanometer and about ten nanometers on said tube for converting said thermal energy into narrow band radiation, and
    a photovoltaic array spaced outwardly from said tube to convert said radiation into electrical energy.

2. Energy conversion apparatus as claimed in claim 1 wherein the thin film comprises a rare earth oxide emitter selected from the group consisting of neodymia, erbia, holmia, and ytterbia.

3. Energy conversion apparatus for converting thermal energy to electrical energy comprising
    (a) a selective emitter comprising
        a first cylinder of a low emittance material,
        a second cylinder of a window material transmissive of radiation emitted in a narrow wavelength band spaced outwardly from said first cylinder in concentric relationship thereto thereby forming a chamber in the space between said first and second cylinders,
        a pair of oppositely disposed end walls extending between said first and second cylinders for sealing said chamber at the ends thereof,
        an inert gas enclosed in said chamber,
        particles of a rare earth oxide emitter having diameters between about 0.01 μm and about 0.1 μm adapted to be suspended in said inert gas, said rare earth oxide having large emittance in said narrow wavelength band and small emittance outside said band, and
        means for passing heat through said first cylinder whereby said inert gas is heated to produce radiation in said narrow wavelength band, and
    (b) a photovoltaic array spaced outwardly from said second cylinder to convert said radiation into said electrical energy.

4. Energy conversion apparatus as claimed in claim 3 wherein the inert gas is helium.

5. Energy conversion apparatus as claimed in claim 3 wherein the particles are of a rare earth oxide selected from the group consisting of neodymia, erbia, holmia, and ytterbia.

6. Energy conversion apparatus as claimed in claim 3 including a first cylinder of a material selected from high temperature glass and fused silica for operation at temperatures between about 1000 K. and about 1500 K.

7. Energy conversion apparatus as claimed in claim 3 including a second cylinder of a high temperature glass.

8. Energy conversion apparatus as claimed in claim 3 including a second cylinder of fused silica.

9. Energy conversion apparatus as claimed in claim 3 including a first cylinder of sapphire for operation at temperatures above 1500 K.

10. Energy conversion apparatus as claimed in claim 9 including a second cylinder of sapphire for operation at temperatures above 1500 K.

* * * * *